US009650973B1

(12) United States Patent
Hellstrom et al.

(10) Patent No.: US 9,650,973 B1
(45) Date of Patent: May 16, 2017

(54) METHODS AND SYSTEMS FOR AIRFLOW CONTROL

(71) Applicant: Ford Global Technologies, LLC, Dearborn, MI (US)

(72) Inventors: John Erik Mikael Hellstrom, Ann Arbor, MI (US); Karen Elizabeth Maceroni, Casco, MI (US); Jeffrey Allen Doering, Canton, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 14/928,378

(22) Filed: Oct. 30, 2015

(51) Int. Cl.
*F02D 41/00* (2006.01)
*F02D 9/02* (2006.01)

(52) U.S. Cl.
CPC ......... *F02D 41/0002* (2013.01); *F02D 9/02* (2013.01); *F02D 41/0007* (2013.01); *F02D 2009/0284* (2013.01)

(58) Field of Classification Search
CPC .... F02D 41/0002; F02D 41/0007; F02D 9/02; F02D 2009/0284
USPC .......... 701/103; 123/319, 339.23, 559.1, 564
See application file for complete search history.

(56) References Cited

U.S. PATENT DOCUMENTS

| | | | | |
|---|---|---|---|---|
| 5,125,292 A | * | 6/1992 | Matsuoka | B60W 30/18 123/559.3 |
| 8,967,116 B2 | | 3/2015 | Leone et al. | |
| 2013/0092125 A1 | | 4/2013 | Leone et al. | |
| 2013/0092126 A1 | * | 4/2013 | Leone | F02D 9/1055 123/399 |
| 2013/0098031 A1 | * | 4/2013 | Petrovic | F02D 41/064 60/599 |
| 2013/0333665 A1 | * | 12/2013 | Pursifull | F02B 37/04 123/399 |

FOREIGN PATENT DOCUMENTS

WO     2011156059 A3     12/2011

* cited by examiner

*Primary Examiner* — Mahmoud Gimie
(74) *Attorney, Agent, or Firm* — Julia Voutyras; McCoy Russell LLP (57) ABSTRACT

Methods and systems are provided for airflow control in an engine system which includes a throttle turbine generator including a turbine and a turbine generator. In one example, a method may include adjusting an angle of a throttle positioned in an engine inlet passage based on a desired airflow by taking into account the effects on the throttle angle due to rotation motion of the turbine, thereby accurately controlling airflow to the engine system. The method may further include predicting an airflow to the engine system based on the position of the throttle, thereby accurately monitoring torque of the engine system.

20 Claims, 7 Drawing Sheets

METHODS AND SYSTEMS FOR AIRFLOW CONTROL

FIELD

The present description relates generally to methods and systems for airflow control in an engine system which includes a throttle turbine generator.

BACKGROUND/SUMMARY

Engine systems may be configured with devices such as a throttle turbine generator to harness energy from a pressure difference across a throttle that is otherwise wasted in an intake passage of an engine. For example, the throttle turbine generator may be driven by a pressure difference across a partially open throttle when the engine is run at part load. In some examples, the throttle turbine generator includes a turbine mechanically coupled to the throttle turbine generator which may generate current that is supplied to a battery of the engine. By charging the battery with such a generator, fuel economy of the engine system may be improved.

One example of such an engine system is shown by Leone et al in US20130092125. Therein, a throttle turbine generator is positioned in a throttle bypass. A throttle bypass valve is controlled based on an engine airflow demand to adjust airflow through the throttle turbine generator. Additionally, a throttle position is controlled during engine transients to meet an engine airflow demand.

However, the inventors herein have recognized potential issues with such a system. As one example, when using the pressure difference across the intake manifold to operate the turbine using the throttle, air flow control around the intake manifold becomes more challenging due to continually varying speeds of the turbine and/or generator. In addition, any change to the throttle position simultaneously affects two paths in the intake side of the engine, making airflow control via the throttle challenging. To accurately estimate the airflow, variables such as throttle angle, cross-sectional area of restriction formed by the throttle, pressure difference across the intake manifold and turbine speed may need to be adaptively controlled. As such, to achieve accurate airflow control in view of the multiple variables, one or more four-dimensional performance maps may need to be generated, stored, and accessed quickly. However, generating, storing, and accessing complicated four-dimensional maps may be time, memory, and computation intensive. In particular, besides the complexity of generating and accessing the high-dimensional maps, they may also be prohibitively large to store in an engine controller unit due to memory constraints. As another example, Leone only adjusts the throttle position during transients. However, there may be airflow errors even during steady-state conditions due to variations (e.g., instantaneous) in the speed of the turbine and/or generator.

The inventors have recognized that by learning the pressure difference generated across the intake manifold as a function of throttle angle, at least one two-dimensional map be generated (e.g., in real-time or in advance) and stored in the memory of an engine control unit. Herein, based on each of the pressure difference, and throttle angle, the effective cross-sectional area of the restriction around the throttle may be tabulated. Furthermore, a correction to the effective cross-sectional area of the restriction may be determined by including the effects of turbine speed, for example, which may be stored as a separate two-dimensional map. By performing numerical approximations to the at least two two-dimensional maps, the throttle angle may be accurately determined for effectual airflow control. In addition, from the two two-dimensional maps it may also be possible to accurately predict airflow at a given throttle angle which may then be used for estimating airflow into the manifold for torque monitoring, for example. This results in an approach that is less computation, memory, and time intensive, without compromising on airflow estimation accuracy. Furthermore, the airflow control is performed not just during transient conditions, as shown by Leone et al but during other conditions such as steady-state, idling, etc.

In one example, engine airflow control may be achieved by a method comprising: feed-forward adjusting an intake throttle coupled to a throttle turbine based on driver torque demand; and further adjusting the intake throttle based on each of a first function of a pressure difference across the throttle turbine, and a second, different function of the pressure difference multiplied by turbine speed. In this way, airflow control may be performed accurately and efficiently.

As an example, in response to a driver torque demand, the demanded torque may be delivered from an engine by adjusting a throttle angle of an intake throttle. Since adjusting the throttle angle also adjusts an effective cross-sectional area of a restriction formed by the throttle at an intake pipe, an engine controller may be configured to take into account the impact of the turbine speed on the effective cross-sectional area of the restriction. In particular, the controller may refer to one or more two-dimensional (2D) maps stored in the controller's memory to subtract out this effect, enabling accurate control of air-flow to deliver the demanded torque. For example, the controller may use a first 2D map to learn a first (e.g., initial) adjustment to the position (such as the angle) of the intake throttle based on a first function of a pressure difference across the throttle turbine. Further, the controller may use another 2D map to learn a second, different (e.g., further) adjustment to the position of the intake throttle based on each of the pressure difference across the throttle and a turbine speed of a throttle turbine generator coupled in a bypass across the throttle. As such, the maps may also be used for determining a first airflow amount based on the throttle angle for torque monitoring for example. For example, the controller may use a first 2D map to learn an amount of airflow to the engine based on the position (such as the angle) of the intake throttle based on a first function of a pressure difference across the throttle turbine. Further, the controller may use another 2D map to learn a second, different (e.g., further) adjustment to the airflow amount based on each of the pressure difference across the throttle and a turbine speed of a throttle turbine generator coupled in a bypass across the throttle.

In this way, accurate air flow and torque control may be provided in the presence of an intake throttle turbine and turbine generator. The technical effect of adjusting an intake throttle angle based on a pressure difference across the throttle turbine as well as the turbine speed is that the pressure and airflow effect of the change in throttle angle can be better compensated for. By relying on one or more 2D maps, the airflow control may be performed with increased accuracy without relying on multiple computationally, memory, and time intensive algorithms or maps. In addition, the airflow control can be performed over a wider range of engine operating conditions, including transient and steady-state engine operating conditions. Overall, by improving airflow control, it may be possible to obtain fuel economy benefits while maintaining drivability and emission requirements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
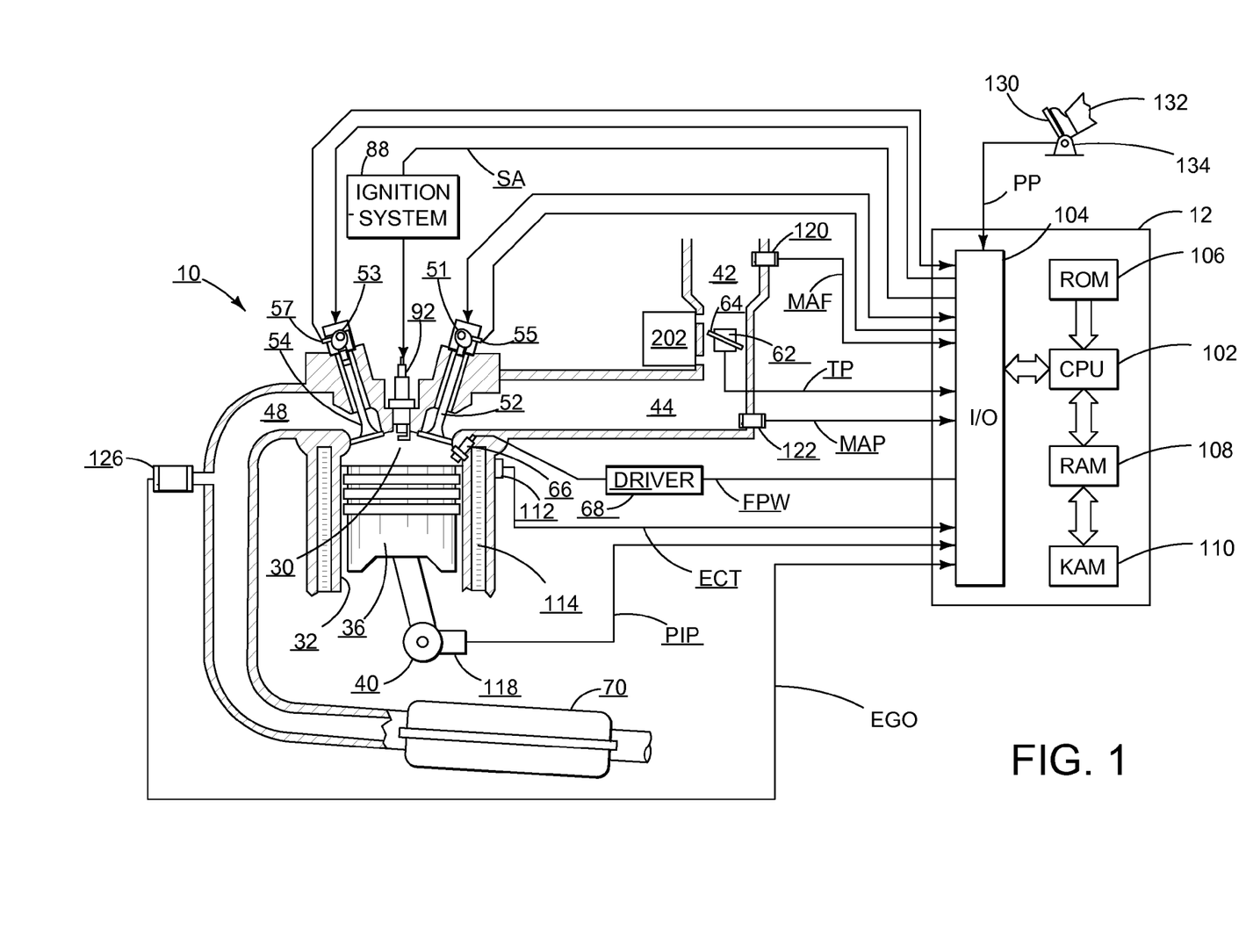
FIG. 1 shows a schematic diagram of an engine.
Figure 2:
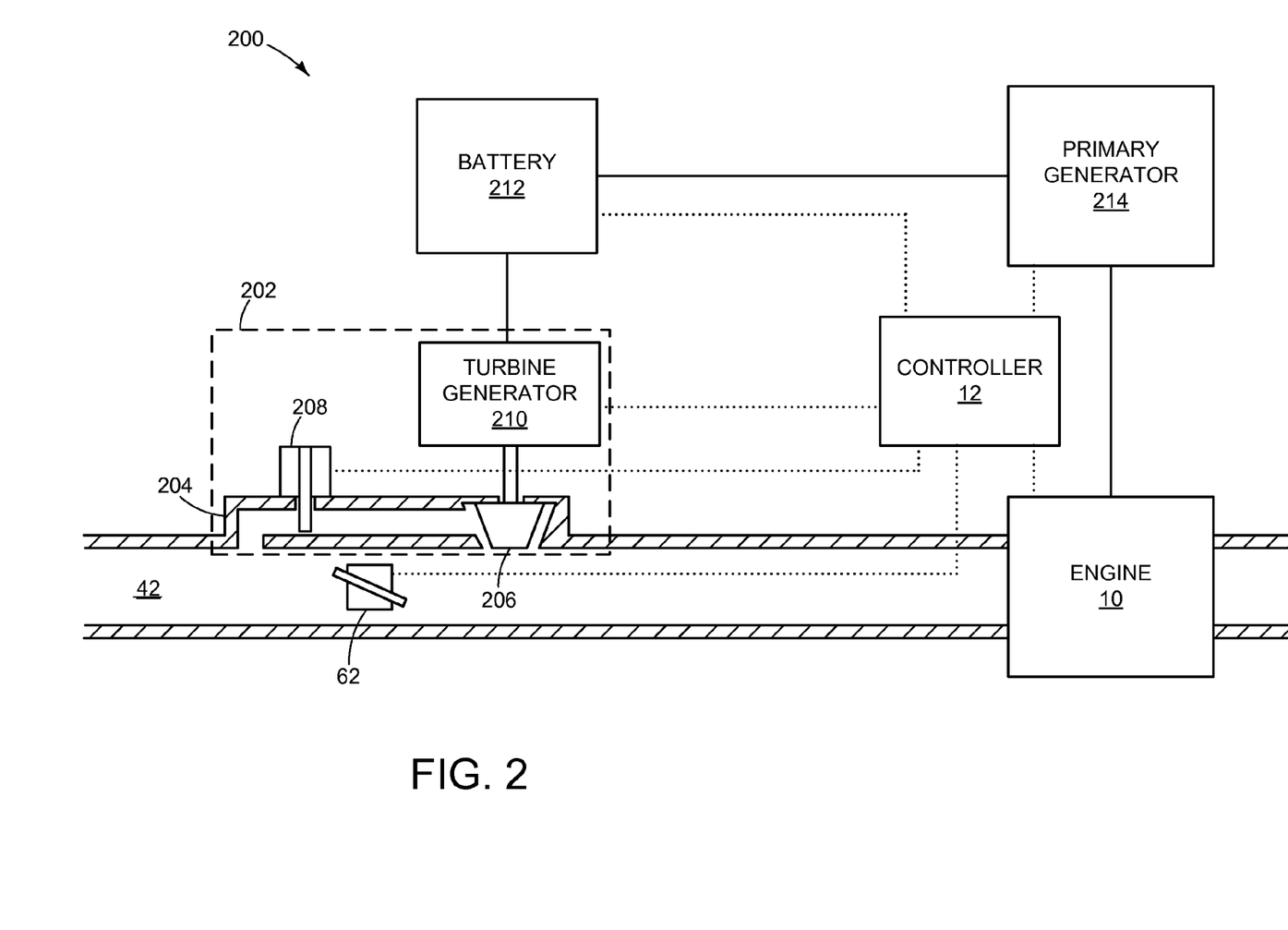
FIG. 2 shows a schematic diagram of a throttle turbine coupled to a throttle turbine generator and a throttle in an inlet passage of the engine.
Figure 3A:
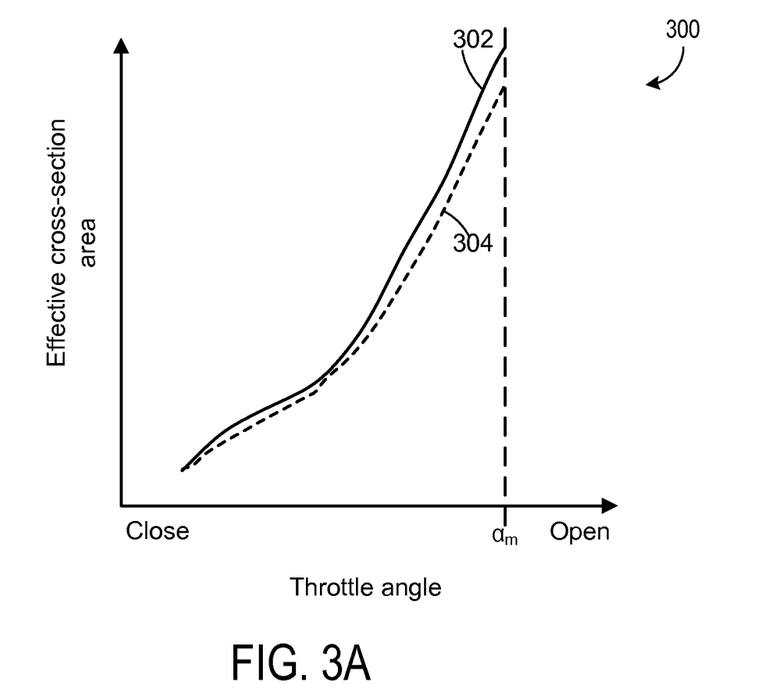
FIG. 3A shows an example relationship between a throttle angle and an effective cross-section area of a restriction formed by the throttle.
Figure 3B:
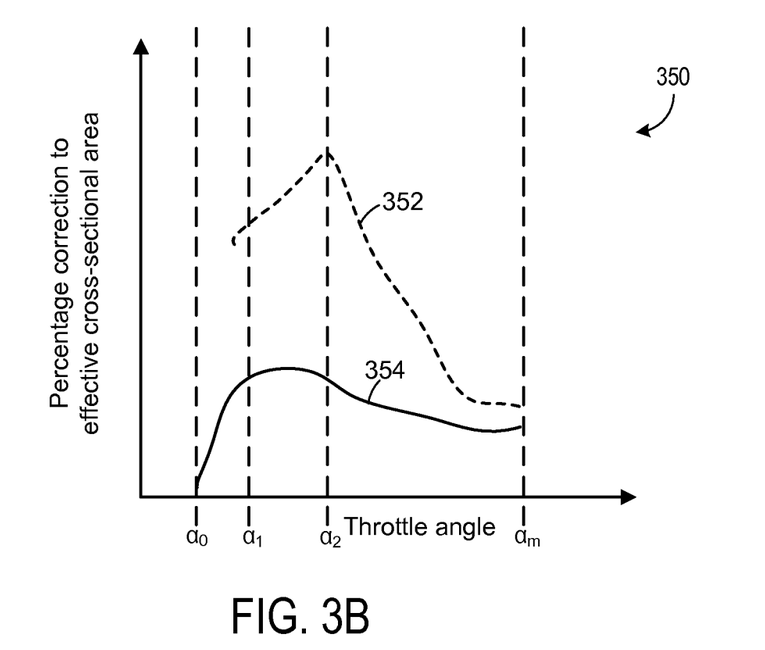
FIG. 3B shows an example relationship between the throttle angle and turbine speed.

The following description relates to systems and methods for controlling airflow to an engine, such as the engine system shown in FIG. 1. The engine may include a throttle bypass around a throttle disposed in an intake system of the engine, as shown in FIG. 2. Further, the throttle bypass may include a turbine in communication with an auxiliary generator (FIG. 2). The airflow in the intake system may be adjusted by adjusting a throttle angle of the throttle. As such, adjusting the throttle angle may further affect an effective cross-sectional area of restriction formed by the throttle, as shown in FIG. 3A. However, the air flow control in the intake system becomes more challenging due to varying speeds of the turbine and/or generator, as shown in FIG. 3B. A controller may be configured to perform a routine, such as the example routine of FIG. 4, to compute a throttle angle based on a desired airflow and/or predict an airflow at a given throttle angle. In doing so, engine intake airflow may be controlled while taking into account the effects of turbine speed on the throttle angle, as shown in FIG. 5. The controller may also be configured to perform a routine, such as the example routine of FIG. 6, to control the engine intake airflow based on a desired torque by adjusting the throttle angle, and/or to estimate engine airflow for the purpose of torque monitoring based on the throttle angle. An example control of airflow and throttle angle based on torque demand and turbine speed is shown in FIG. 7. In this way, airflow may be accurately controlled.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 (also known as intake throttle) having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position (TP) signal. Intake passage 42 may include a mass air flow sensor 120 and/or a manifold absolute pressure sensor 122 for providing respective signals MAF and MAP to controller 12. In some embodiments, one or more pressure sensors may be located upstream and/or downstream of the throttle for estimating a pressure difference across the throttle and generating pressure difference signal to controller 12.

Further, a throttle turbine generator 202 is coupled to intake passage 42 in a bypass around throttle 62. Throttle turbine generator 202, which will be described in greater detail with reference to FIG. 2, includes a turbine which drives a turbine generator (also known as auxiliary). Typically a pressure difference is created around the throttle 62 which is then used to drive the turbine and the turbine generator. For example, when the throttle is fully open, the intake manifold is typically at ambient atmospheric pressure. When the throttle is partially closed, for example, a manifold vacuum may develop as the intake drops below ambient pressure thereby generating the pressure difference. The auxiliary generator may provide charge to a battery of the engine as a supplement to charging by a mechanically driven primary generator and/or as a main source of charging, for example when the primary generator degrades or fails. However, due to operation of the turbine, air flow control around the intake manifold becomes more challenging due to varying speeds of the turbine and/or generator. In addition, any change to the throttle position simultaneously affects two paths in the intake side of the engine, making airflow control via the throttle challenging as described herein with reference to FIGS. 3A and 3B.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and manifold absolute pressure signal, MAP, from sensor 122, etc. Engine speed signal, RPM, may be generated by controller 12 from signal PIP. Turbine speed of the turbine may be inferred by controller 12 based on the output of the throttle turbine generator. Alternatively, the turbine speed may be measured via a dedicated turbine speed sensor. Manifold absolute pressure signal MAP from a manifold pressure sensor may be used to provide an indication of vacuum, or pressure, in the intake manifold. In some embodiments, one or more pressure sensors may be located upstream and/or downstream of the throttle for estimating a pressure difference across the throttle. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Continuing to FIG. 2, throttle turbine generator 202 is shown in an engine system 200 which includes engine 10 described above with reference to FIG. 1. Throttle turbine generator 202 includes turbine 206 (also known as throttle turbine) and throttle bypass valve 208 disposed in throttle bypass 204 and turbine generator 210 which is driven by turbine 206. As such, the turbine 206 is located in the throttle bypass 204 around the intake throttle 62 at the intake pipe and the throttle bypass may be configured to route intake air from a position upstream of the intake throttle to a position downstream of the intake throttle. In some embodiments, the throttle turbine generator may not include throttle bypass valve 208. Instead, the throttle may have a wedge-shaped blade, for example, which blocks airflow to the throttle bypass under some conditions.

Throttle turbine generator 202 uses energy that is typically wasted by throttling engine intake air. For example, the change in pressure across intake throttle 62 may be used to direct airflow through turbine 206. Turbine 206 drives turbine generator 210 (herein also referred to as auxiliary generator), which provides current to battery 212. In such a configuration, overall efficiency of the engine system may be improved, for example, as charging of battery 212 via mechanically driven primary generator 214 may be reduced and charging via auxiliary generator 210 may be increased during some operating conditions.

As depicted, intake air flows through intake passage 42 and through intake throttle 62. As described above, a throttle position may be varied by controller 12 such that an amount of intake air provided to cylinders of the engine is varied. Throttle bypass 204 directs intake air from a position upstream of intake throttle 62 and around intake throttle 62 to a position downstream of throttle 62. The intake air may be directed through throttle bypass 204 by a pressure difference across the throttle, for example. Further, in the example embodiment shown in FIG. 2, throttle turbine generator 202 includes throttle bypass valve 208. One or more of the throttle bypass valve 208 and the intake throttle 62 may be modulated based on signals received from controller 12 to adjust the flow of intake air to the turbine 206, as described below with reference to FIGS. 3A and 3B. For example, the controller may send a signal to an electromechanical actuator coupled to the throttle, the actuator causing an angle of the throttle to be increased by moving the throttle towards a more open position, or causing the angle of the throttle to be decreased by moving the throttle towards a more closed position. In some examples, throttle bypass valve 208 may be an on/off valve which opens and closes throttle bypass 204. In other examples, throttle bypass valve 208 may be a flow modulating valve which controls a variable amount of airflow through throttle bypass 204. Throttle bypass valve 208 may be a plunger or spool valve, a gate valve, a butterfly valve, or another suitable flow control device. Further, throttle bypass valve 208 may be actuated by a solenoid, a pulse width modulated solenoid, a DC motor, a stepper motor, a vacuum diaphragm, or the like.

In some embodiments, in addition to, or in place of, adjusting the throttle valve angle, an angle (or on/off state) of the throttle bypass valve may be adjusted. For example, a dependency may be added to the first and second functions for computing a predicted effective area, as elaborated with reference to FIG. 4 (such as at steps 410 and 412 of FIG. 4). However, addition of this dependency to the maps may cause an increase in map input dimension from 2D to 3D.

Airflow directed through throttle bypass 204 flows through turbine 206 which spins auxiliary generator 210 with energy extracted from the airflow. Auxiliary generator 210 generates current which is supplied to battery 212. Battery 212 may provide power to various components of an electrical system of the vehicle in which engine system 200 is disposed, such as lights, pumps, fans, fuel injection, ignition, air-conditioning, and the like. Battery 212 may be further charged by primary generator 214 which is mechanically driven by engine 10. Charging of battery 212 may be coordinated between primary generator 214 and auxiliary generator 210 such that overall efficiency of the system is increased. For example, auxiliary generator 210 may provide current to battery 212 during conditions when providing current to battery 212 from primary generator 214 would increase fuel consumption, such as during vehicle cruising or acceleration. Further, auxiliary generator 210 may provide current to battery 212 when primary generator 214 is degraded or failed. Auxiliary generator 210 may be a less powerful generator, for example, which generates less current than primary generator 214. In some examples, the intake throttle 62 may be adjusted to adjust an amount of energy generated at a turbine generator coupled to the turbine, as explained below. Adjusting the amount of energy generated in the turbine generator may include increasing an electrical power output of the turbine generator 210 under selected operating conditions. Adjusting the amount of energy generated in the turbine generator may further include charging one or more of a battery and a primary generator using the amount of energy generated in the turbine generator. In one example, a speed of the throttle turbine (the turbine speed) may be inferred based on an electrical output (e.g., current or voltage) of the generator. In another example, the turbine speed may be estimated by a speed sensor coupled to the turbine (e.g., to the turbine shaft).

The controller 12 receives signals from the various sensors of FIGS. 1 and 2 and employs the various actuators of FIGS. 1 and 2 to adjust engine operation based on the received signals and instructions stored on a memory of the controller. For example, adjusting the intake throttle may include adjusting an electromechanical actuator coupled to a throttle plate in the intake system to rotate the throttle valve by the calculated angle by sending a control signal from the controller to the actuator.

As described earlier, a difference in pressure across throttle 62 may be used to direct airflow through turbine 206 (also referred to as throttle turbine). When using this pressure difference to operate the throttle turbine using the throttle, air flow control around the intake manifold 44 becomes challenging due to varying speeds of the throttle turbine and/or generator. Further, any change to the throttle position of the throttle 62 simultaneously affects two paths (e.g., throttle bypass 204 and intake passage 42) in the intake side of the engine, making airflow control via the throttle challenging. However, it may be possible to increase accuracy of airflow control without significantly increasing computation intensity by including the effects of turbine speed, as explained below.

As such, flow of air through the restriction formed by the throttle may depend on the effective cross-sectional area of the restriction, and the pressure difference occurring across the throttle turbine. Mathematically, this can be represented as equation (1):

$$W = A_E \frac{P_{us}}{\sqrt{RT_{us}}} \varphi\left(\frac{P_{ds}}{P_{us}}\right) \tag{1}$$

where W is the flow of air, $A_E$ is the effective cross-sectional area of the restriction, $P_{us}$ is the upstream pressure, $P_{ds}$ is the downstream pressure, $T_{us}$ is the upstream temperature, and R is the gas constant. Herein, the function $\phi$ is given by equation (2):

$$\varphi(x) = \sqrt{\frac{2\gamma}{\gamma-1}\left(x^{\frac{2}{\gamma}} - x^{\frac{\gamma+1}{\gamma}}\right)} \tag{2}$$

where x is saturated at choke flow and is given by equation (3):

$$x = \max\left(\frac{P_{ds}}{P_{us}}, \frac{2}{\gamma+1}^{\frac{\gamma}{\gamma-1}}\right) \tag{3}$$

where $\gamma$ is the ratio of specific heats for the gas.

In equations (1) through (3), R and $\gamma$ may be constants, or may have time-varying values estimated by the engine controller. As such, the flow through the intake air path equipped with a turbine and/or generator is described as a restriction where an effective area $A_E$ is a function of thermodynamic conditions, valve angle, and state of the turbine/generator. Mathematically, this can be represented as equation (4):

$$A_E = F_1(\alpha, \Delta P)[1 - F_2(\alpha, \Delta P)\omega] \tag{4}$$

where $\Delta P = P_{us} - P_{ds}$ is the pressure difference across the throttle turbine, $\omega$ is the turbine speed and $\alpha$ is the throttle angle. Herein, the first term of equation (4) or the first function, $F_1$ represents the effective area $A_E$ when the turbine is at standstill or spinning very slowly ($\omega \sim 0$, for example), and the second term or function $F_2$ represents a correction to the effective area $A_E$ when effects of the turbine is taken into account (w≠0, for example). As such the product $\omega F_1 F_2$ may be a third function $F_3$ that describes the proportionality constant by which the effective area reduces with increasing turbine speed. The first and the second functions are graphically represented in plots 300 and 350 of FIG. 3A and FIG. 3B, respectively.

Continuing onto FIG. 3A, plot 300 shows example relationships between a throttle angle and an effective cross-section area of restriction formed by the throttle at various pressure difference ΔP across the throttle turbine. Herein, the effective cross-sectional area $A_E$ may be represented by first function $F_1$ when there is no turbine/generator in the throttle bypass. Throttle angle is shown along the horizontal axis, and the effective cross-section area (also the same as the first function $F_1$ of equation (4)) is shown along the vertical axis. Plot 302 shows the effective cross-sectional area at higher pressure difference ΔP when turbine speed is zero, and plot 304 shows the effective cross-section area at lower pressure difference when the turbine speed is still zero. Plot 302 shows the effective cross-section area at ΔP of 14 inHg, for example, and plot 304 shows the effective cross-section area at ΔP of 5 inHg, for example. As the throttle angle increases, the flow through the throttle turbine increases (plots 302 and 304), reaching a maximum around the point when the passage (that is, the inlet to the throttle bypass, such as throttle bypass 204 of FIG. 2) is fully opened. In particular, as the intake throttle opens, it gradually uncovers the inlet passage to the throttle turbine. Once the passage is fully opened and the valve is opened further, the path of low resistance is through the throttle and most of the flow bypasses the turbine.

However, when the turbine/generator is present in the throttle bypass, in order to accurately determine the effective cross-section area of the restriction around the throttle, a correction is applied as described in equation (4). Herein, the second term or second function $F_2$ is the correction for turbine speed and is shown in plot 350 of FIG. 3B. Plot 354 shows a percentage correction to the effective cross-section area at higher pressure difference when turbine speed is non-zero, and plot 352 shows the effective cross-section area at lower pressure difference when the turbine speed is non-zero. Plot 354 shows the correction at ΔP of 14 inHg, for example, and plot 352 shows the correction at ΔP of 5 inHg, for example. As such, plots 300 and 350 may be generated based on the performance maps/tables stored in the memory of the controller.

By comparing the plots 302 and 354 and similarly plots 304 and 352, the effect of turbine speed on the effective cross-section area around the throttle can be more reliably determined. Herein, when there is no turbine, the effective area of cross-section continues to increase with throttle angle (plot 302). However, when effects of turbine speed is included, the effective cross-section area has a more complicated profile (plot 354). In plot 354, between α0 and α1, the correction increases as the throttle angle increases from α0 to α1. However, as the throttle angle is increased beyond α1, the correction begins to decrease with increasing throttle angle (plot 354). The effects are more pronounced when the pressure difference is lower (plot 352). Herein, the correction increases when the throttle angle is increased from α1 to α2 (plot 352). When the throttle angle is increased beyond α2, the correction starts to decrease steeply (plot 352).

In order to take into account the effects of the turbine speed on the intake airflow, and accurately determine the airflow, four variables, namely throttle angle, cross-sectional area of restriction formed by the throttle, pressure difference across the intake manifold and turbine speed may need to be adaptively controlled. Herein, for a desired airflow based on torque demand, for example, the throttle angle may be determined by solving equation (4). For this, four-dimensional performance maps (also called look-up tables) with these variables may need to be generated and accessed quickly in order to accurately determine the throttle angle for the desired airflow. However, generating, storing, and accessing complicated four-dimensional maps may be time, memory, and computation intensive.

Figure 4:
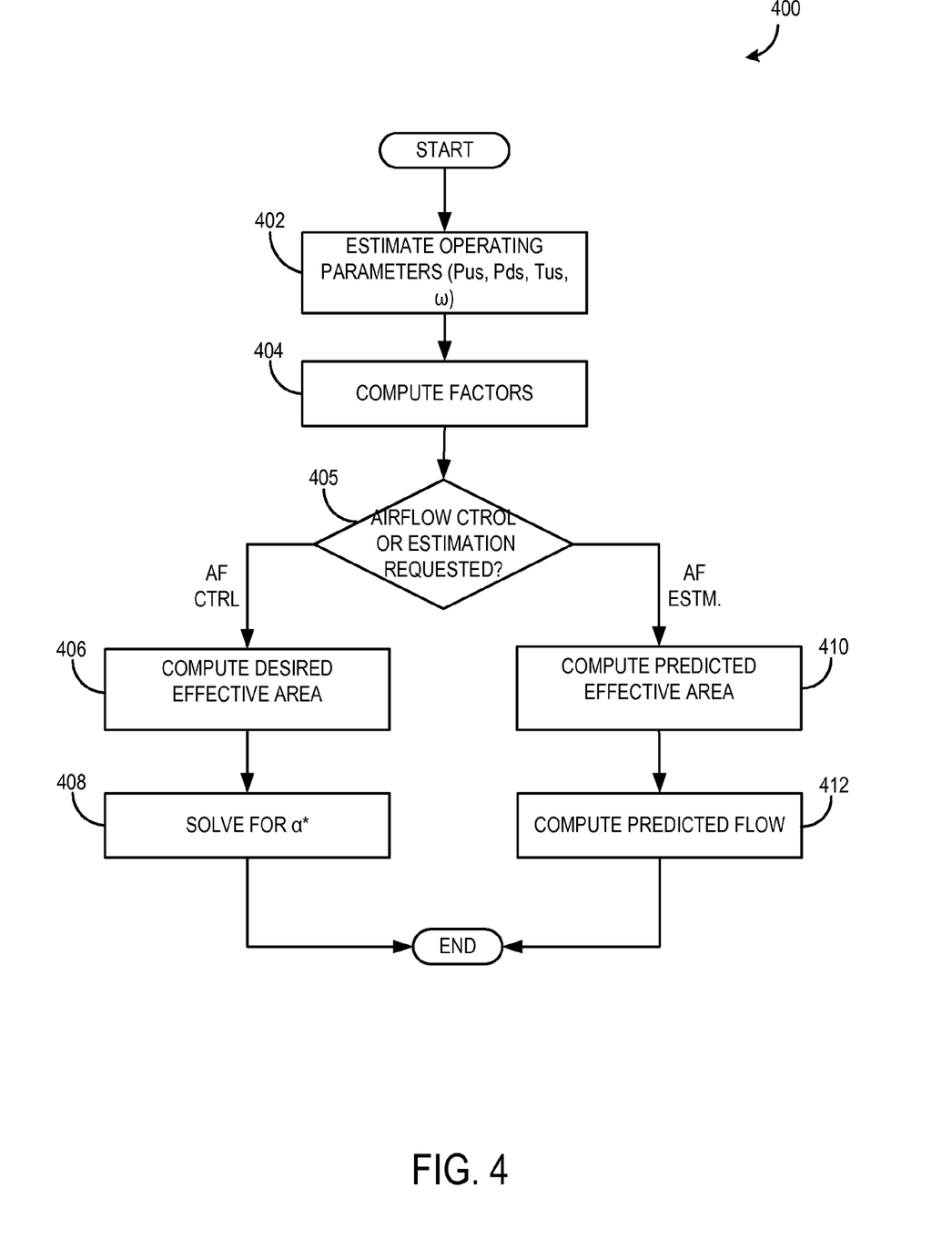
FIG. 4 shows a high level flowchart depicting an example method computing the throttle angle based on a desired engine intake airflow and/or predicting an expected airflow at a given throttle angle.
Figure 5:
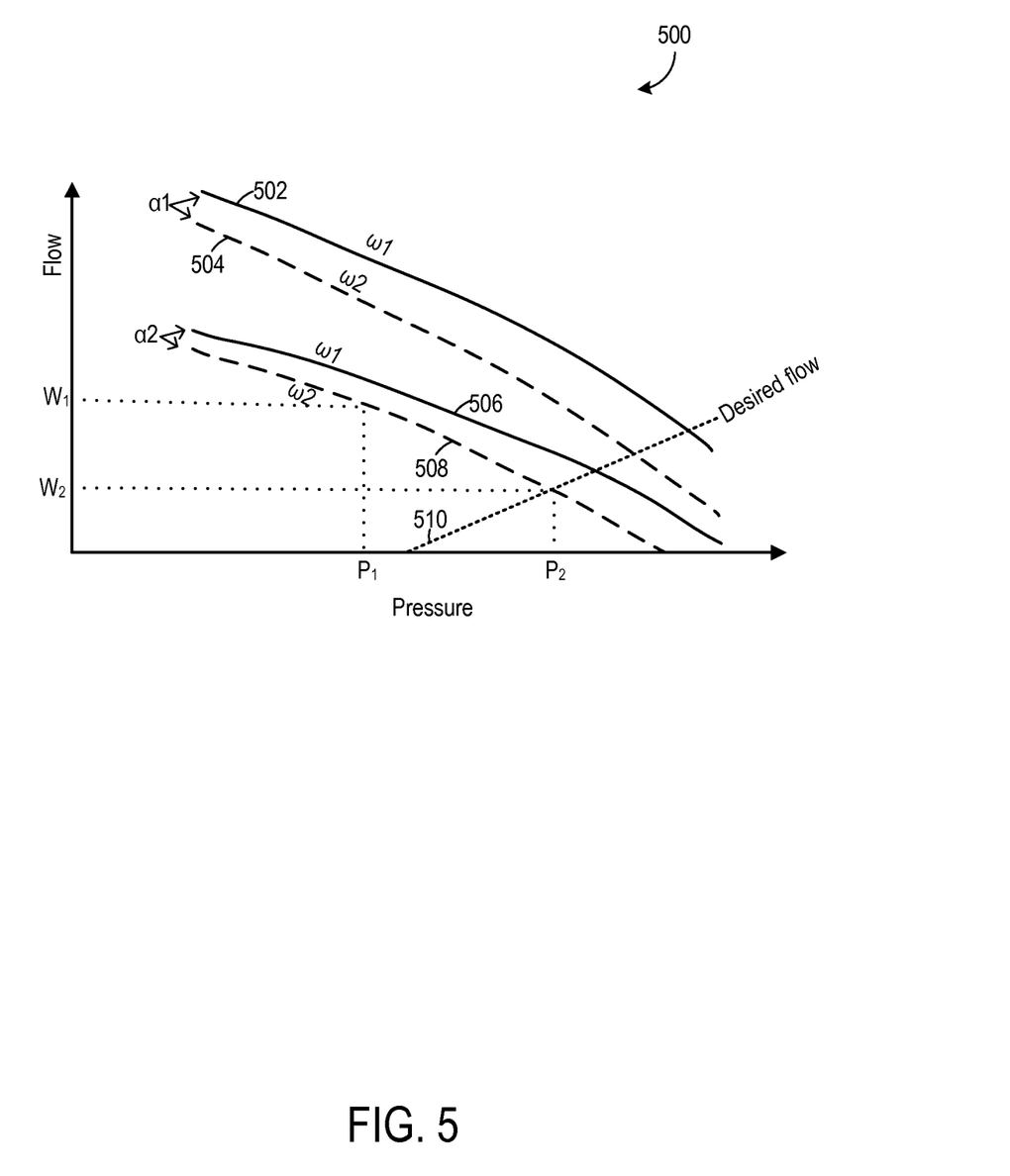
FIG. 5 shows an example relationship between desired airflow and downstream pressure of the throttle at various throttle angles and turbine speeds, for a given upstream pressure of the throttle.

The inventors have identified an approach including numerical adjustments (e.g., numerical approximations) that use relatively straight-forward two-dimensional performance maps to solve equation (4) and accurately control airflow in the engine system, as described in FIG. 4. Instructions for carrying out method 400 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

Method 400 of FIG. 4 describes a method based on numerical approximations to accurately determine throttle angle for a desired airflow. In addition, method 400 may be used to predict airflow at a specified throttle angle for torque monitoring. Specifically, the method deduces the throttle angle and predicts engine intake airflow by solving equation (4) without reliance on complicated four-dimensional performance maps. However, it will be appreciated that 4-D maps may be additionally used, if desired.

Method 400 begins at 402 where engine operating parameters may be estimated and/or determined. Operating parameters such as pressures ($P_{us}$ and $P_{ds}$), temperature ($T_{us}$), turbine speed (ω), etc., may be measured or estimated by the controller (such as controller 12 of FIG. 1) based on the output of one or more sensors. For example, $P_{us}$ and $P_{ds}$ may be measured/estimated by one or more pressure sensors located upstream and downstream of the throttle. $T_{us}$ may be measured or estimated by temperature sensors, and turbine speed may be computed from the output of turbine generator or via a speed sensor coupled to the turbine shaft, for example. Herein, the pressures $P_{us}$ and $P_{ds}$ refer to the upstream and downstream pressure respectively, and may be further used to estimate a pressure difference ΔP across the engine intake throttle. In addition to operating parameters such as pressure, temperature, and turbine speed, thermodynamic parameters such as γ which is the ratio of specific heats for air and R which is the gas constant may also be determined. As such, these thermodynamic parameters are calibrated constants (γ=1.4 and R=287 J/kg K, for example). In some examples, these thermodynamic parameters may be further based on temperature and composition of intake air. Still other engine operating parameters that are assessed may include engine speed, engine temperature, boost pressure, EGR (flow rate or percentage, for example), etc.

At 404 of method 400, factors such as $$\frac{\sqrt{RT_{us}}}{P_{us}}$$

and $$\varphi\left(\frac{P_{ds}}{P_{us}}\right)$$

may be computed based on operating parameters and thermodynamic parameters measured/estimated at 402. These factors correspond to airflow through the restriction given by equations (1) and (2). The method then determines, at 405, if airflow control or airflow estimation is requested. If airflow control is requested, then at 406, a desired effective area of restriction formed by the throttle, $A_E^*$ may be determined based on a desired airflow W*. Else, if airflow estimation is requested, then at 410, an airflow prediction at a given throttle angle is determined for torque monitoring.

At 406, the desired effective area $A_E$ determined based on a desired airflow W* (which is further based on torque demand) follows from equation (1) and can further be written as equation (5):

$$A_E^* = W^* \left( \frac{\sqrt{RT_{us}}}{P_{us}\varphi\left(\frac{P_{ds}}{P_{us}}\right)} \right) \quad (5)$$

where φ is given by equations (2) and (3). Herein, W* is determined based on torque demand, for example. Then, method proceeds to 408 to solve for the desired throttle angle α*. The desired throttle angle α* is determined by solving equation (4) which is rewritten below as equation (6):

$$A^*_E = F_1(\alpha^*, \Delta P)[1 - F_2(\alpha^*, \Delta P)\omega] \quad (6)$$

The solution for α* may be determined by solving the non-linear equation (6). However, equation (6) may be difficult to solve and as such solving this may be time consuming as well. The inventors have recognized that by including numerical approximations it may be possible to solve equation (6) without generating complicated four-dimensional maps or tables, for example.

An example solution is shown below which uses an iterative method using a Newton numerical approximation method to solve for α*. Herein, the following equation (7):

$$\alpha_{k+1} = \alpha_k - \frac{F_1(\alpha_{k_r}, \Delta P)[1 - F_2(\alpha_{k_r}, \Delta P)\omega] - A_E^*}{F_1'(\alpha_{k_r}, \Delta P)[1 - F_2(\alpha_{k_r}, \Delta P)\omega] - F_1(\alpha_{k_r}, \Delta P)[F_2'(\alpha_{k_r}, \Delta P)\omega]} \quad (7)$$

is iterated for k=0, 1, . . . and so on. The starting value $\alpha_0$, may be taken as the current throttle angle or given by equation (8):

$$\alpha_0 = F_1^{-1}(A^*_E, \Delta P) \quad (8)$$

using the inverse of $F_1(\alpha, \Delta P)$ with respect to α. The values of $F_1'(\alpha_k, \Delta P)$ and $F_2'(\alpha_k, \Delta P)$ denote sensitivities or derivatives of the functions $F_1(\alpha, \Delta P)$ and $F_2(\alpha, \Delta P)$ with respect to a. The functions $F_1'(\alpha_k, \Delta P)$, $F_2'(\alpha_k, \Delta P)$ and $F_1^{-1}(A^*_E, \Delta P)$ may be stored as performance maps or lookup tables which is then accessed by the controller to perform online computations.

In this way, by learning the pressure difference generated across the intake manifold as a function of throttle angle, a two-dimensional map may be generated and stored in an engine control unit. Furthermore, a correction to the effective cross-sectional area of the restriction may be determined by including the effects of turbine speed for example, which may be stored as a separate two-dimensional map. By performing numerical approximations to the two two-dimensional maps, the throttle angle may be accurately determined for effectual airflow control. In one example, the least complex solution is obtained if the computations are performed once, say k is set to 0 and the value of α* is taken as $\alpha_1$. The iteration may be stopped after any number of chosen number of iterations, and/or until $|\alpha_{k+1} - \alpha_k|$ is lower than a threshold (a predetermined value, for example) and the last computed value $\alpha_{k+1}$ of is taken as the solution for the throttle angle α*.

Herein, based on a desired torque, an airflow may be estimated. Further, based on the estimated airflow, the throttle angle may be determined by performing numerical approximations as described, and the throttle may be adjusted to the calculated throttle angle. Herein, adjusting the intake throttle includes adjusting an electromechanical actuator coupled to a throttle plate in the intake system to rotate the throttle valve by the calculated angle by sending a control signal from the controller to the actuator. As such, adjusting the throttle angle of the intake throttle further includes adjusting an amount of energy generated at a turbine generator coupled to the throttle turbine, for example. Adjusting the amount of energy generated in the turbine generator may further include increasing an electrical power output of the turbine generator under selected operating conditions and may also include charging one or more of a battery and a primary generator using the amount of energy generated in the turbine generator.

Returning to 410, where an accurate prediction of airflow at a given throttle angle is desired, method 400 includes computing the predicted effective area $\hat{A}_E$ based on an input throttle angle. Herein, the predicted effective area may be mathematically represented as equation (9):

$$\hat{A}_E = F_1(\alpha, \Delta P)[1 - F_2(\alpha, \Delta P)\omega] \quad (9)$$

where ΔP, and ω are determined at 402 of method 400. Next, the method proceeds to 412, where the predicted airflow Ŵ is computed. As such, the predicted airflow may be mathematically represented as equation (10):

$$\hat{W} = A_E \frac{P_{us}}{\sqrt{RT_{us}}} \varphi\left(\frac{P_{ds}}{P_{us}}\right) \quad (10)$$

where the variable computed or estimated at 402 may be used to predict the airflow. Similar to the numerical approximations performed to determine the throttle angle α*, numerical approximations may be performed on equation (9) to predict airflow Ŵ at a given throttle angle α. As such, the predicted airflow may be used for estimating the flow into the intake manifold for state estimation, which may be further used for torque monitoring and for model reference control applied to the throttle. Thus, instead of computing inverses of functions and using four-dimensional maps, that can be time, memory, and computation intensive, it may be possible to predict the airflow for a given throttle angle by performing numerical approximations quickly and efficiently without compromising accuracy. The method for airflow control is depicted graphically in FIG. 5. In this way, throttle angle for desired flow and also airflow for given throttle angle may be determined using numerical approximation methods, thereby effecting accurate airflow control.

FIG. 5 shows an example relationship between desired airflow and downstream pressure of the throttle at various throttle angles and turbine speed. Herein the upstream pressure may be maintained substantially constant (22.4 in Hg, for example). In plot 500, the downstream pressure is depicted along the horizontal axis, and the flow thorough the throttle is depicted along the vertical axis. Plot 502 shows the airflow as a function of downstream pressure when the turbine is at standstill or at turbine speed $\omega 1$ (or $\omega 1=0$, for example), when the throttle angle is $\alpha 1$ ($\alpha 1=12°$, for example). Plot 504 shows the airflow as a function of downstream pressure when the turbine speed is $\omega 2$ ($\omega 2=60000$ rpm, for example), at the same throttle angle $\alpha 1$. The difference between the plots 502 and 504 may determine the effects of turbine speed on flow, for example. Plot 506 shows the airflow as a function of downstream pressure when the turbine is at standstill or at turbine speed $\omega 1$ (or $\omega 1=0$, for example), when the throttle angle is $\alpha 2$ ($\alpha 1=10°$, for example). Plot 504 shows the airflow as a function of downstream pressure when the turbine speed is $\omega 2$ ($\omega 2=60000$ rpm, for example), at throttle angle $\alpha 2$. For example, it is possible to predict airflow $W_1$ for pressure $P_1$ with throttle angle $\alpha_2$ and turbine speed $\omega 2$.

Plot 500 also shows a desired flow curve (plot 510), which relates to downstream pressure $P_{ds}$ and flow $W_2$ as shown. As such, desired airflow $W_2$ may be computed based on a desired torque. Given a desired flow (plot 510), the intersection between the desired curve (plot 510) and the curve for the measured turbine speed defines the desired angle. For example, if the measured turbine speed is $\omega 2$, then the intersection of plot 510 and plot 508 gives the desired angle as $\omega 2$. In this way, the throttle angle adjustments may be calculated for a desired flow based on torque demand.

Figure 6:
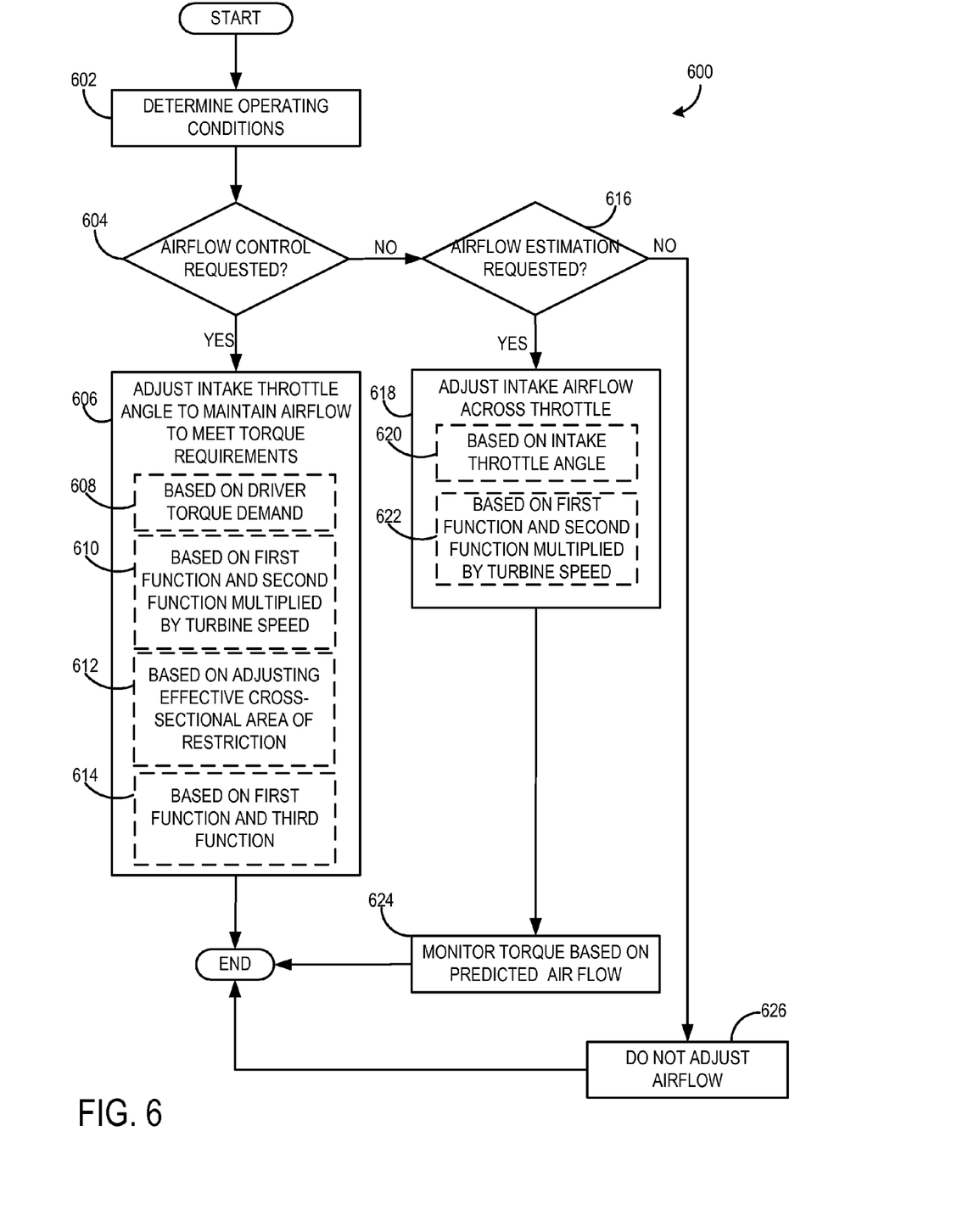
FIG. 6 shows a high level flowchart depicting a method for controlling intake airflow based on a desired torque by adjusting the throttle angle and/or for estimating intake airflow for torque monitoring based on the throttle angle.
Figure 7:
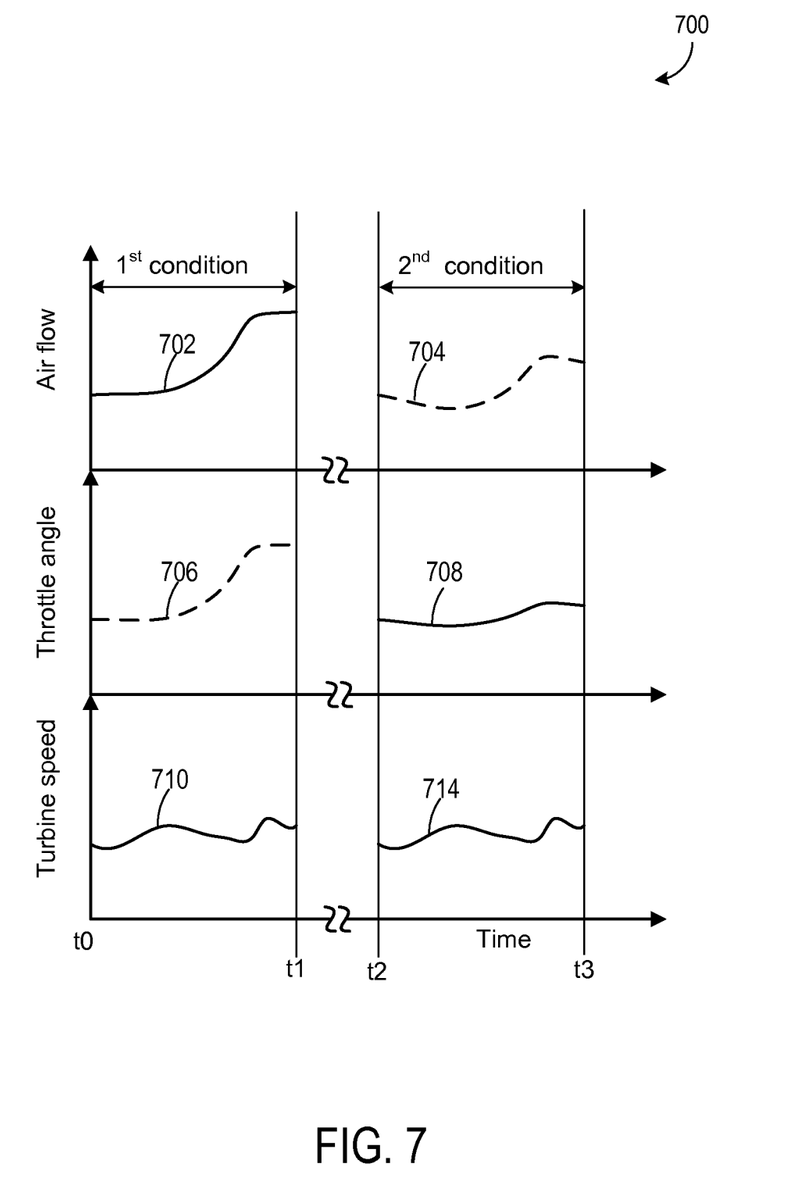
FIG. 7 shows an example relationship between torque demand, intake airflow, throttle angle, and turbine speed.

Continuing to FIG. 6, a method 600 for controlling airflow to the engine during is shown. Specifically, method 600 adjusts the airflow to the cylinders of the engine (e.g., load) based by adjusting the throttle, while accounting for rotational speed of the turbine. For example, speed of the turbine may affect airflow up to 10%, which may be corrected by the method in order to get accurate airflow control and torque delivery. In addition, method 600 predicts the airflow to the cylinders of the engine based on an input throttle angle which may then be used for estimating airflow into the manifold for torque monitoring, for example.

At 602 of method 600, engine operating conditions are determined. The operating conditions may include engine speed, engine load, intake air flow rate and/or pressure, throttle position, accelerator pedal position, ambient pressure, ambient temperature, turbine speed and the like. Operating conditions may further include determining if the engine is at steady-state, idling, transient conditions, etc. In addition to determining operating conditions, thermodynamic conditions may also be determined. As such, determining thermodynamic conditions include calculating thermodynamic parameters such as ratio of specific heats for the gas $\gamma$, gas constant R, etc.

Once the operating conditions are determined, method 600 proceeds to 604 where it may be determined if airflow control is requested. For example, airflow control may be requested when there is a sudden increase (e.g., due to a tip-in) or a sudden decrease (e.g., due to a tip-out) in torque demand. In some examples, airflow control may be requested if the torque demand steadily increases and/or steadily decreases by a threshold amount. In some more examples, airflow control may be requested in response to a request for adjusting a power output of the auxiliary generator.

If airflow control is requested, then method 600 proceeds to 606, where a throttle angle may be adjusted based on the desired airflow to meet torque requirements. As such, the throttle angle may be determined by solving equation (6) by performing numerical approximations as explained earlier. Method 600 includes performing airflow by making feedforward adjustments to an intake throttle coupled to a throttle turbine based on driver torque demand at 608. Method 600 further includes adjusting the intake throttle based on each of a first function of a pressure difference across the throttle turbine, and a second, different function of the pressure difference multiplied by turbine speed at 610. As such, adjusting the intake throttle further includes adjusting a throttle angle of the intake throttle. Herein, adjusting the intake throttle includes adjusting an electromechanical actuator coupled to a throttle plate in the intake system to rotate the throttle valve by the calculated angle by sending a control signal from the controller to the actuator. Adjusting the intake throttle further includes adjusting an effective cross-sectional area of a restriction formed by the intake throttle at an intake pipe at 612. The adjusting of the throttle angle may be further based on a difference between the first function of the pressure difference and a third function of the pressure difference, the third function of the pressure difference different from each of the first function and the second function at 614. The third function may be a product of each of the first function, the second function and the turbine speed. The effective cross-sectional area may increase proportional to the third function when the turbine speed is lower than a threshold, and wherein the effective cross-sectional area may decrease proportional to the third function when the turbine speed is higher than the threshold. Method 600 then ends.

In this way, accurate air flow control may be maintained in the presence of the turbine and turbine generator, thus making it possible to obtain fuel economy benefits while maintaining drivability and emission requirements.

If airflow control is not requested at 604, method 600 proceeds to 612 where it is determined if airflow estimation is requested. If airflow estimation is requested, then method 600 proceeds to 618 where an intake airflow across the throttle turbine may be predicted or adjusted. Adjusting the intake airflow across the throttle turbine may be based on the intake throttle angle at 620. Furthermore, adjusting the intake airflow may also be based on each of the first function of intake throttle angle, and a second, different function of the intake throttle angle multiplied by turbine speed at 622. Herein, the turbine speed is determined based on a pulse output of the auxiliary generator, for example. Once the intake airflow is adjusted or predicted, method 600 proceeds to 624, where the torque may be monitored based on the predicted airflow and method ends. However, if airflow estimation is not requested at 616, method 600 proceeds to 626 where airflow may not be adjusted and subsequently the method ends. In this way, by using functions and numerical approximations, accurate airflow control may be maintained by both estimating intake throttle angle for a desired airflow to meet torque requirements, and further predicting airflow at given throttle angle for torque monitoring.

Turning now to FIG. 7, map 700 shows an example airflow control during two conditions, wherein the first condition includes adjusting throttle angle based on desired airflow and the second condition includes adjusting the airflow based on throttle angle. Plot 702 shows the desired airflow, which is further based on a desired torque demand, for example. Plot 710 shows the turbine speed, estimated from the output of the turbine generator, for example. Plot 706 (dashed line) shows the throttle angle determined based on the desired airflow. Herein, during the first condition, the intake throttle angle (plot 706) of a throttle coupled to a throttle turbine may be adjusted based on each of a first function of a pressure difference across the throttle turbine, and a product of a second, different function of the pressure difference and turbine speed (plot 710).

Between t0 and t1, a first condition may be confirmed wherein an increased airflow may be desired (plot 702). Increased airflow may be desired when a torque demand increases, for example. Thus based on a request for airflow control, the throttle angle may be adjusted while maintaining an airflow across the throttle turbine to meet an increase in driver torque demand, for example. Taking into account the turbine speed (710), the throttle angle may be increased (plot 706). Furthermore, the amount by which the intake throttle angle is increased is determined based on equations (5) and (6) as explained earlier. Briefly, adjusting the intake throttle angle of a throttle coupled to a throttle turbine may be based on each of a first function of a pressure difference across the throttle turbine, and a product of a second, different function of the pressure difference and turbine speed. Furthermore, during the first condition, the adjusting of the throttle angle includes a feed-forward adjustment during nominal engine operation, and further includes a feed-back adjustment during engine idling. When turbine speed effects are negligible, for example, adjusting the intake throttle angle of the throttle may be based on the first function when condition of throttle turbine includes one or more of a standstill or spinning at lower than a threshold speed. During the first condition, a request for airflow control may be received and the throttle angle may be adjusted while maintaining an airflow across the throttle turbine and while delivering a driver torque demand. In this way, accurate airflow control to meet torque demands may be effected by taking into account the effects of turbine speed. The technical effect of adjusting the throttle angle based on the desired flow while taking into account the turbine speed, is that the airflow to the engine is controlled more accurately.

Between t1 and t2, a second condition may be confirmed wherein a request for airflow estimation may be received. During the time between t2 and t3, the airflow (plot 704) across the throttle turbine may be adjusted while maintaining the intake throttle angle (plot 708) and while estimating the airflow into a manifold as explained with reference to equations (9) and (10). Briefly, during the second condition between t2 and t3, the intake airflow (plot 704) across the throttle turbine may be adjusted based on each of a first function of intake throttle angle (function based on throttle angle given by plot 708), and the product of a second, different function of the intake throttle angle and the turbine speed (plot 714). Thus, during the second condition, a request for airflow estimation may be received and the airflow across the throttle turbine may be adjusted while maintaining the intake throttle angle and while estimating the airflow into a manifold.

In this way, by using functions and numerical approximations, accurate airflow control may be maintained by both estimating intake throttle angle for a desired airflow to meet torque requirements, and further predicting airflow at given throttle angle for torque monitoring. The technical effect of adjusting the throttle angle based on the desired flow and further predicting the airflow based on the throttle angle, while taking into account the turbine speed, is that the airflow to the engine is controlled more accurately and the torque is monitoring is more controlled.

The systems and methods described above also provide for a method for engine airflow control, the method comprising feed-forward adjusting an intake throttle coupled to a throttle turbine based on driver torque demand, and further adjusting the intake throttle based on each of a first function of a pressure difference across the throttle turbine, and a second, different function of the pressure difference multiplied by turbine speed. In a first example of the method, adjusting the intake throttle and further adjusting the intake throttle may additionally or alternatively include adjusting a throttle angle of the intake throttle. A second example of the method optionally includes the first example and further includes wherein adjusting the intake throttle includes adjusting an effective cross-sectional area of a restriction formed by the intake throttle at an intake pipe. A third example of the method optionally includes one or more of the first and second examples, and further includes further adjusting the throttle angle based on a difference between the first function of the pressure difference and a third function of the pressure difference, the third function of the pressure difference different from each of the first function and the second function. A fourth example of the method optionally includes one or more of the first through third examples, and further includes wherein the third function is a product of each of the first function, the second function and the turbine speed. A fifth example of the method optionally includes one or more of the first through fourth examples, and further includes wherein the effective cross-sectional area increases proportional to the third function when the turbine speed is lower than a threshold, and wherein the effective cross-sectional area decreases proportional to the third function when the turbine speed is higher than the threshold. A sixth example of the method optionally includes one or more of the first through fifth examples, and further includes wherein adjusting the throttle angle of the intake throttle further includes adjusting an amount of energy generated at a turbine generator coupled to the throttle turbine. A seventh example of the method optionally includes one or more of the first through the sixth examples, and further includes wherein the throttle turbine is located in a throttle bypass around the intake throttle at an intake pipe, the throttle bypass configured to route intake air from a position upstream of the intake throttle to a position downstream of the intake throttle. An eighth example of the method optionally includes one or more of the first through the seventh examples, and further including wherein adjusting the amount of energy generated in the turbine generator includes increasing an electrical power output of the turbine generator under selected operating conditions. A ninth example of the method optionally includes one or more of the first through the seventh examples, and further includes charging one or more of a battery and a primary generator using the amount of energy generated in the turbine generator. A tenth example of the method optionally includes one or more of the first through the ninth examples, and further includes wherein the turbine speed is computed based on a pulse output of the turbine generator.

The systems and methods described above also provide for a method, the method comprising, during a first condition, adjusting an intake throttle angle of a throttle coupled to a throttle turbine based on each of a first function of a pressure difference across the throttle turbine, and a product of a second, different function of the pressure difference and turbine speed, and during a second condition, adjusting an intake airflow across the throttle turbine based on each of a first function of intake throttle angle, and product of a second, different function of the intake throttle angle and the turbine speed. In a first example of the method, the method may additionally or alternatively include adjusting the intake throttle angle of the throttle based on the first function when condition of throttle turbine includes one or more of a standstill or spinning at lower than a threshold speed. A second example of the method optionally includes the first example, and further includes wherein during the first condition, a request for airflow control is received. A third example of the method optionally includes one or more of the first and the second examples, and further includes wherein during the first condition, the throttle angle is adjusted while maintaining an airflow across the throttle turbine and while delivering a driver torque demand. A fourth example of the method optionally includes one or more of the first through the third examples, and further includes wherein during the first condition, the adjusting of the throttle angle includes a feed-forward adjustment during nominal engine operation, and further includes a feed-back adjustment during engine idling. A fifth example of the method optionally includes one or more of the first through the fourth examples, and further includes wherein during the second condition, a request for airflow estimation is received. A sixth example of the method optionally includes one or more of the first through the third examples, and further includes wherein during the second condition, the airflow across the throttle turbine is adjusted while maintaining the intake throttle angle and while estimating the airflow into a manifold.

The systems and methods described above also provide for a system for an engine comprising a throttle disposed in an intake passage of the engine, a throttle bypass configured to route intake air from a position upstream of the throttle to a position downstream of the throttle, one or more pressure sensors located upstream and/or downstream of the throttle for estimating a pressure difference across the throttle, and a turbine disposed in the throttle bypass, the turbine configured to drive an auxiliary generator in electrical communication with a battery, the battery in further electrical communication with a primary generator. In a first example of the system, the system may additionally or alternatively include a controller with computer readable instructions stored on non-transitory memory configured for in response to a request for adjusting a power output of the auxiliary generator, adjusting an angular position of the throttle based on each of a first function of a pressure difference across the throttle turbine, and a second, different function of the pressure difference multiplied by turbine speed. A second example of the particulate matter sensor optionally includes the first example and further includes wherein the controller includes further instructions for, in response to a request for airflow estimation, adjusting an intake airflow across the turbine based on each of the first function of the angular position of the throttle, and a second, different function of the angular position of the throttle multiplied by turbine speed, the turbine speed determined based on a pulse output of the auxiliary generator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for engine airflow control, comprising:
feed-forward adjusting an intake throttle coupled to a throttle turbine based on driver torque demand; and
further adjusting the intake throttle based on each of a first function of a pressure difference across the throttle turbine, and a second, different function of the pressure difference multiplied by turbine speed.

2. The method of claim 1, wherein adjusting the intake throttle and further adjusting the intake throttle includes adjusting a throttle angle of the intake throttle.

3. The method of claim 2, wherein adjusting the intake throttle includes adjusting an effective cross-sectional area of a restriction formed by the intake throttle at an intake pipe.

4. The method of claim 2, further comprising, further adjusting the throttle angle based on a difference between the first function of the pressure difference and a third function of the pressure difference, the third function of the pressure difference different from each of the first function and the second function.

5. The method of claim 4, wherein the third function is a product of each of the first function, the second function and the turbine speed.

6. The method of claim 3, wherein the effective cross-sectional area increases proportional to the third function when the turbine speed is lower than a threshold, and wherein the effective cross-sectional area decreases proportional to the third function when the turbine speed is higher than the threshold.

7. The method of claim 2, wherein adjusting the throttle angle of the intake throttle further includes adjusting an amount of energy generated at a turbine generator coupled to the throttle turbine.

8. The method of claim 7, wherein the throttle turbine is located in a throttle bypass around the intake throttle at an intake pipe, the throttle bypass configured to route intake air from a position upstream of the intake throttle to a position downstream of the intake throttle.

9. The method of claim 7, wherein adjusting the amount of energy generated in the turbine generator includes increasing an electrical power output of the turbine generator under selected operating conditions.

10. The method of claim 7, further comprising charging one or more of a battery and a primary generator using the amount of energy generated in the turbine generator.

11. The method of claim 10, wherein the turbine speed is computed based on a pulse output of the turbine generator.

12. A method comprising,
during a first condition, adjusting an intake throttle angle of a throttle coupled to a throttle turbine based on each of a first function of a pressure difference across the throttle turbine, and a product of a second, different function of the pressure difference and turbine speed; and
during a second condition, adjusting an intake airflow across the throttle turbine based on each of a first function of intake throttle angle, and product of a second, different function of the intake throttle angle and the turbine speed.

13. The method of claim 12, further comprising adjusting the intake throttle angle of the throttle based on the first function when condition of throttle turbine includes one or more of a standstill or spinning at lower than a threshold speed.

14. The method of claim 12, wherein during the first condition, a request for airflow control is received.

15. The method of claim 14, wherein during the first condition, the intake throttle angle is adjusted while maintaining an airflow across the throttle turbine and while delivering a driver torque demand.

16. The method of claim 12, wherein during the first condition, the adjusting of the intake throttle angle includes a feed-forward adjustment during nominal engine operation, and further includes a feed-back adjustment during engine idling.

17. The method of claim 12, wherein during the second condition, a request for airflow estimation is received.

18. The method of claim 17, wherein during the second condition, the intake airflow across the throttle turbine is adjusted while maintaining the intake throttle angle and while estimating the intake airflow into a manifold.

19. A system for an engine, comprising:
a throttle disposed in an intake passage of the engine;
a throttle bypass configured to route intake air from a position upstream of the throttle to a position downstream of the throttle;
one or more pressure sensors located upstream and/or downstream of the throttle for estimating a pressure difference across the throttle;
a turbine disposed in the throttle bypass, the turbine configured to drive an auxiliary generator in electrical communication with a battery, the battery in further electrical communication with a primary generator; and
a controller with computer readable instructions stored on non-transitory memory configured for:
in response to a request for adjusting a power output of the auxiliary generator,
adjusting an angular position of the throttle based on each of a first function of a pressure difference across the turbine, and a second, different function of the pressure difference multiplied by turbine speed.

20. The system of claim 19, wherein the controller includes further instructions for, in response to a request for airflow estimation, adjusting an intake airflow across the turbine based on each of the first function of the angular position of the throttle, and a second, different function of the angular position of the throttle multiplied by the turbine speed, the turbine speed determined based on a pulse output of the auxiliary generator.

* * * * *